United States Patent [19]

Schwarzler

[11] Patent Number: 4,510,421
[45] Date of Patent: Apr. 9, 1985

[54] LINEAR MAGNET

[75] Inventor: Peter Schwarzler, Fürstenfeldbruck, Fed. Rep. of Germany

[73] Assignee: Krauss-Maffei Aktiengesellschaft, Munich, Fed. Rep. of Germany

[21] Appl. No.: 512,414

[22] Filed: Jul. 8, 1983

[30] Foreign Application Priority Data

Jul. 10, 1982 [DE] Fed. Rep. of Germany ....... 3225948

[51] Int. Cl.³ ............................................. H02K 41/02
[52] U.S. Cl. .................................................... 318/135
[58] Field of Search .................................. 310/12-14; 318/135

[56] References Cited

U.S. PATENT DOCUMENTS

| 3,911,828 | 10/1975 | Schwärzler | 318/135 X |
| 3,913,045 | 10/1975 | Von Starck | 310/13 X |
| 4,006,373 | 2/1977 | Ross | 310/13 |
| 4,131,812 | 12/1978 | English | 310/13 |
| 4,286,180 | 8/1981 | Langley | 310/12 |
| 4,299,173 | 11/1981 | Arima et al. | 318/135 X |
| 4,408,139 | 10/1983 | Schwärzler | 310/13 |

FOREIGN PATENT DOCUMENTS

| 743278 | 12/1967 | Belgium . |
| 1964621 | 6/1971 | Fed. Rep. of Germany . |
| 2137691 | 2/1974 | Fed. Rep. of Germany . |
| 2321618 | 11/1974 | Fed. Rep. of Germany . |
| 2333773 | 1/1975 | Fed. Rep. of Germany . |
| 2146142 | 8/1976 | Fed. Rep. of Germany . |
| 2446408 | 9/1976 | Fed. Rep. of Germany . |
| 3041940 | 6/1982 | Fed. Rep. of Germany . |

OTHER PUBLICATIONS

"The Ideal Magnet-Fully Controllable Permanent Magnets For Power and Transport" *Electronics & Power*, By G. R. Polgreen, Jan. 1971, pp. 31-34.

*Magnetschwebetetechnik* "Transrapid 06-Fahrzeugkonzept", Von peter Schwärzler et al., ZEV-Glas. Ann. 105 (1981) Nr. 7/8 Jul./Aug., pp. 216-224.

*Primary Examiner*—Donovan F. Duggan
*Attorney, Agent, or Firm*—Karl F. Ross; Herbert Dubno

[57] ABSTRACT

A linear stator magnet in which the yoke stack is pole shanks flanked by cheek plates which are overlapped by the stabilizing yoke plates and are form and force-locked to projections of these yoke plates. Additional excitation coils are provided around the pole shoes and are connected in circuit with the main excitation coils around the pole shanks so that these additional excitation coils are provided in the gaps between the successive pole shoes and stray flux is minimized.

10 Claims, 8 Drawing Figures

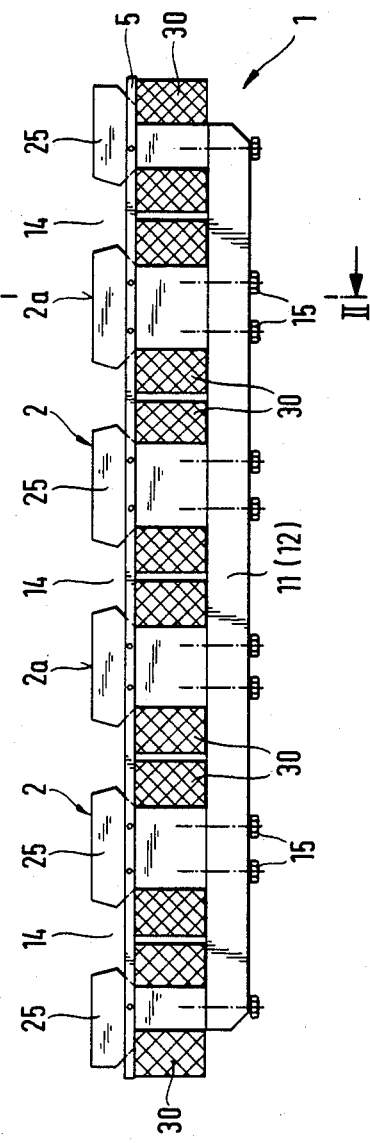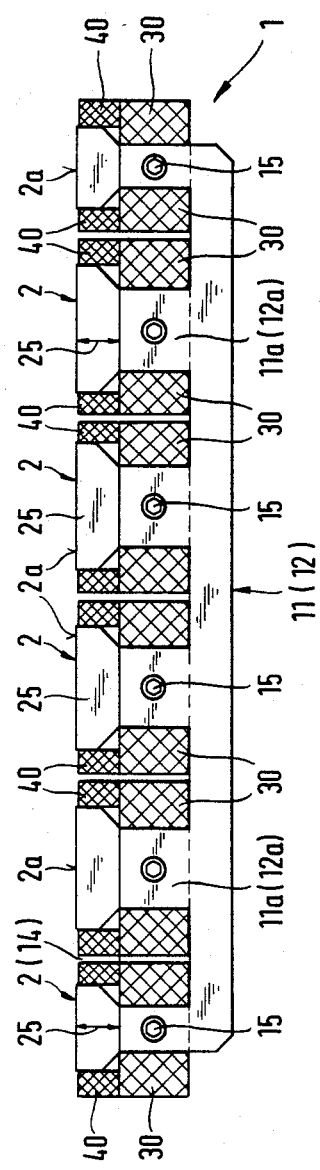

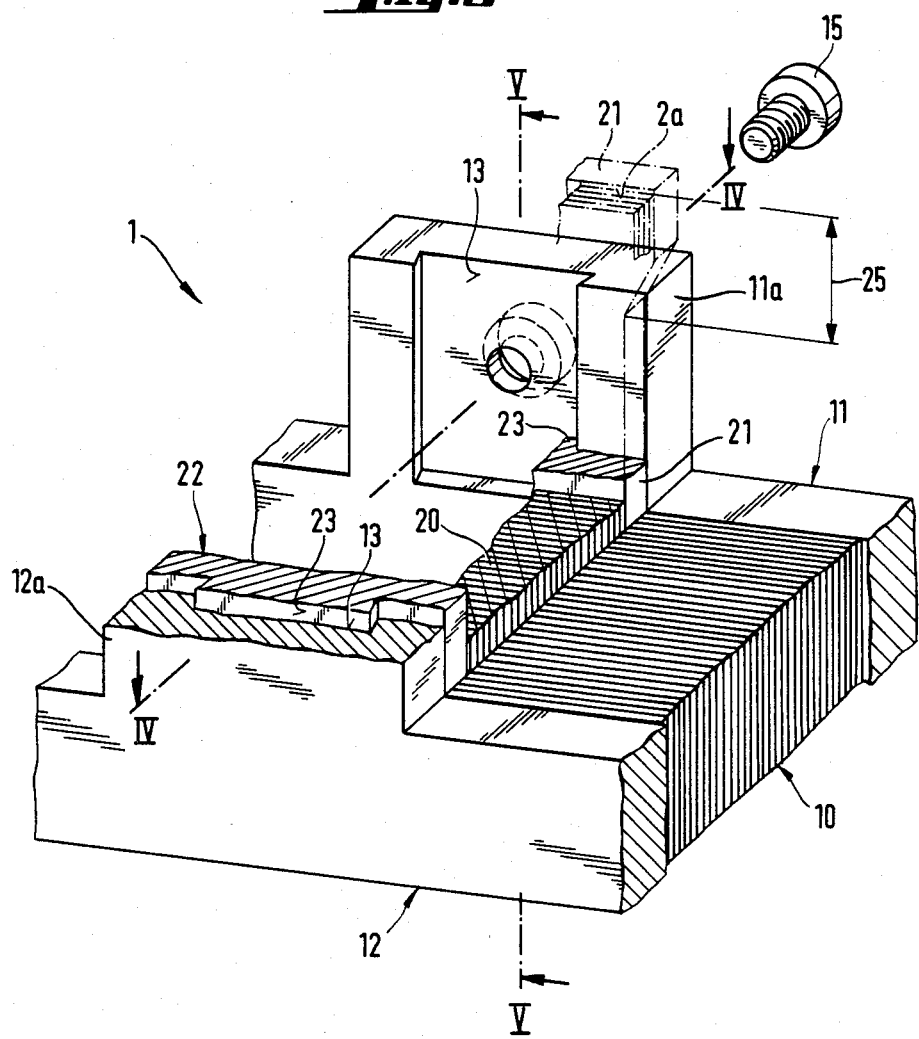

LINEAR MAGNET

CROSS REFERENCE TO RELATED APPLICATION

This application is related to my commonly assigned copending application Ser. No. 284,575 filed 17 July 1981 and dealing with a linear electric motor. Reference may also be had to the following prior patents in which I am a coinventor: 3,804,022, 3,842,748, 3,780,668, 3,820,472, 3,842,749, 3,911,828, 3,895,585, 3,967,561, 3,851,594, 3,842,747.

FIELD OF THE INVENTION

My present invention relates to a linear magnet and, more particularly, to an elongated stator magnet of the type which can be used in a linear electric motor.

BACKGROUND OF THE INVENTION

Linear electric motors are commonly provided for magnetic or air suspension vehicles, e.g. of the type described in the above mentioned patents, where they serve as propulsion means and, if necessary, as magnetic suspension and guide units for such vehicles on a track.

Generally speaking, a linear electric motor of the aforedescribed type can comprise a so-called linear stator having a core provided with a number of coils, one side of the core being provided as a pole face defining a plurality of longitudinally-spaced poles which are juxtaposed with but spaced apart from a so-called reaction rail. The magnet, although it is frequently carried by the vehicle and thus moves in the longitudinal direction, is generally referred to as a stator and the reaction rail, although stationary and mounted upon the track from which the vehicle is suspended, can frequently be referred to as an armature.

The magnetic flux generated in the magnet produces eddy currents in the reacton rail and these eddy currents react with the magnetic field in accordance with well-known linear motor principles to produce a force tending to drive the reaction rail and the magnet in opposite directions parallel to the reaction rail and hence to the longitudinal dimension of the magnet. It is this force which serves as the propulsion force.

Linear stator magnets are also provided as the suspension and guide magnets for such vehicles.

Particular attention, for the purposes of the present invention, should be directed to the linear stator magnet which is described in *Bericht des Statusseminars IX, 1982 "Spurgefuhrter Fernverkehr Magnetbahnentwicklung" des Bundesministeriums fur Forschung und Technologie, Referat* 2.3 (Report of the Ninth Status Seminar, 1982, "Trackbound Long Distance Magnetic Suspension Vehicle Developments" of the Federal Ministry of the Federal Republic of Germany for Research and Technology.).

Such linear stator magnets for the contactless suspension and guidance of tract vehicles, generally comprised a laminated yoke, i.e. a yoke made up from a stack of electrical sheet, defining a plurality of laminated pole shanks spaced apart from one another in the longitudinal direction, and a plurality of excitation coils respectively surrounding these shanks below the respective pole shoes whereby, to either longitudinal side of each yoke sheet stack and the shank stack, pressure plates are provided which are drawn together, e.g. by tensioning means.

OBJECTS OF THE INVENTION

It is the principal object of the present invention to eliminate disadvantages of the prior art linear stator magnet as discussed below with reference to the prior art figures of the drawing.

More particularly, it is an object of the invention to provide a linear stator magnet for the purposes described in which the stray flux from the excitation coils are significantly reduced and the dynamics of the magnet thereby greatly improved.

SUMMARY OF THE INVENTION

These objects and others which will become apparent hereinafter are attained, in accordance with the invention, in a linear stator magnet of the type described wherein the lateral pressure plates of yoke sheet stack comprise a plurality of projections which overlap the lateral pressure plates of the shank sheet stacks substantially to the pole shoes and are formed and force locked thereto while in the gaps between the pole shoes of each two successive pole shanks, additional excitation coils are provided.

The invention thus is not only able to minimize the stray flux from the linear stator magnet, but also provides an improved utilization of the gaps between the pole shoes and of the so-called window cross section over the entire height of the linear stator magnet so as thereby to reduce the weight and size of the magnet for a given magnetic effect or to increase the magnetic effect for a magnet of given weight or size.

The additional excitation coils can be dimensioned to pass a higher current density than the excitation coils provided there below, thereby shifting the current density so that the resultant current density is greatest in the region of the pole shoes or the region of the coils most proximal to the pole surfaces. Since the most concentrated flux is generated at or close to the surfaces, the stray flux is further reduced for a given magnetic output.

When the additional excitation coils, i.e. the auxiliary excitation coils are series-connected with the normal excitation coils, it is advantageous to provide in parallel to the normal excitation coils respective condensers to shunt the higher frequency alternating current components of the suspension force regulator and determining the dynamics of the system so that these higher frequency alternating current components bypass the normal excitation coils and are delivered only to the auxiliary coils and hence are also concentrated in the region of the pole faces.

Since the additional or auxiliary excitation coils suffer fewer losses by comparison with the normal excitation coils because of their greater proximity to the pole surfaces, the condenser serves to further improve the dynamics of the magnetic suspension magnet.

In an embodiment of the invention in which the auxiliary coil is connected in parallel with the normal excitation coil, a series condenser is provided for the auxiliary coil as a DC blocking capacitor so that the auxiliary coil is not traversed by the direct current component, but only by the alternating current component and thus need be dimensioned to resist the thermal conditions resulting from AC energization only without concern for the need to dissipate DC energy.

BRIEF DESCRIPTION OF THE DRAWING

The above and other objects, features and advantages of the present invention will become more readily apparent from the following description, reference being made to the accompanying drawing in which:

FIG. 1 is a diagrammatic longitudinal section through a linear stator magnet representing the prior art;

FIG. 3 is a perspective view of part of a yoke sheet stack, its lateral pressure plate and other parts of a linear stator magnet according to the invention;

FIG. 6 is a side elevational view with the coils broken away, of a linear magnet of the invention.

SPECIFIC DESCRIPTION

In the following description, the discussion of FIGS. 1 and 2 will serve to develop the prior art, while the discussion of FIGS. 3–8 will bear upon the invention and how it distinguishes over this art. When reference is made herein to form-locking, applicant thereby intends to specify that the two parts so locked are interfitted, that is that one of the two parts has a male formation or tongue which is engaged in a complementary female formation or groove of the other part. When it is also said that these two parts are force-locked together, it should be understood therefrom that the two parts also cannot be shifted relative to one another without disassembly.

Figure 2:
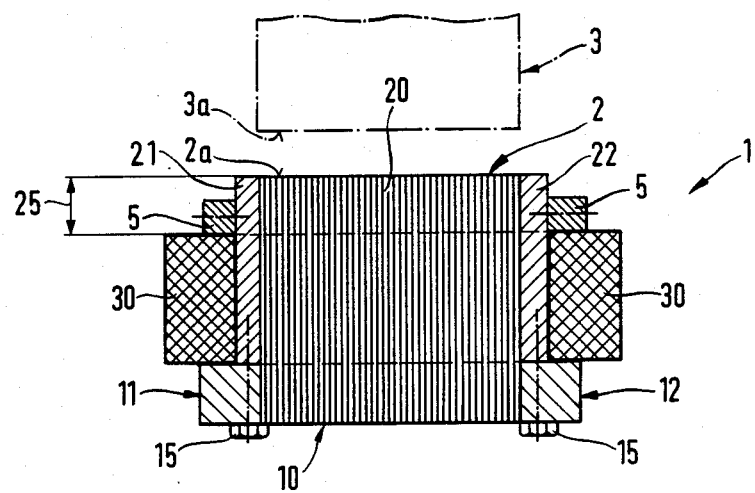
FIG. 2 is a section through this prior art magnet as taken along the line II—II of FIG. 1.

In FIGS. 1 and 2, I have shown a laminated yoke 1 comprising a plurality of longitudinally spaced laminated pole shanks 2, 1, each of which is formed from a stack of magnetic or electrical sheet, i.e. magnetic sheet metal of the type commonly utilized to produce transformer cores.

The pole faces 2a of the pole shanks 2 are turned toward a reaction rail which has been represented in dot-dash lines in FIG. 2 and which has an electrically conductive surface 3a juxtaposed with the pole faces of the magnet. The spacing between the surfaces 2a and 3a can be several millimeters and the magnet can be used as a propulsion or as a suspension or as a guide magnet or any combination of the two or three. The linear stator magnet of the present invention, to be described in connection with FIGS. 3–6 can be similarly utilized.

The pole surface of the linear stator magnet can be grooved. The coils can be supplied by electric current in any conventional way.

To insure the requisite mechanical strength for the yoke stack 10 and the pole stacks 2, on both longitudinal sides of the yoke stack, pressure plates 11 and 12 are provided (see FIG. 2) which lie below the pressure plates 21 and 22 flanking the pole stacks. The pressure plates 21 and 22 are clamped together by bolts traversing the longitudinal bars 5 which flank the pole members 25 and the plates 11 and 12 are connected to the plates 21 and 22 by vertical bolts 15 (FIG. 2). The bars 5 prevent any utilization of the gaps 14 between the pole shoes 25 and limit the excitation coils 30 to the regions of the necks of the pole shanks 2.

Since the areas of the pole shanks which are exposed by the coils 30 and extend between the pole faces 2a and the coils 30 are comparatively large, the stray flux from these areas is correspondingly high. This materially limits the dynamics of the magnet, i.e. the rate at which the suspension force is built up or reduced in response to changes in the energization of the coils.

The high degree of stray flux moreover, means that for a given magnetic effect at the pole faces, the core must have significantly more iron cross section to avoid premature saturation and this suspension force loss at the linear stator magnet. These are the effects which the invention is designed to avoid.

In accordance with the present invention and as illustrated in FIGS. 3 and 6, where similar reference numbers are utilized to indicate similarly functioning parts, it will be apparent that each of the pole shanks 2, formed from a sheet stack, is also provided with a widened pole shoe at its end, turned toward armature or reaction rail, but the bars 5 are completely omitted and the gaps between the pole shoes 5 receive additional excitation coils 40 i.e. the auxiliary coils mentioned previously, which surround the pole shoes and fill the height of the pole shanks from the main excitation coils to the pole surfaces 2a.

Figure 7:
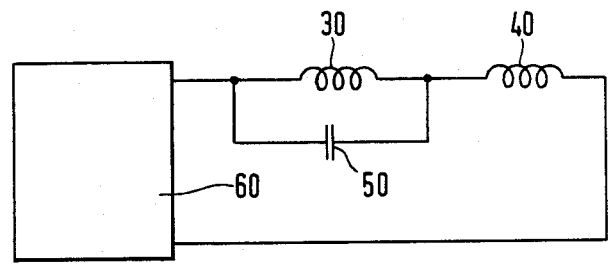
FIGS. 7 and 8 are circuit diagrams representing different modes of connection of the auxiliary and the main excitation coils according to the invention.
Figure 8:
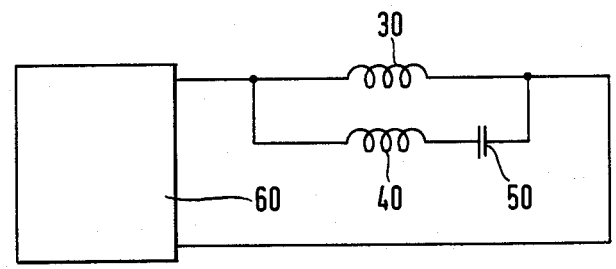

The auxiliary excitation coils as can be seen from FIGS. 7 and 8 can be connected electrically in series with the main excitation coils to the electric current source (FIG. 7) or in parallel to the main excitation coil 30 (FIG. 8).

In the series circuit of FIG. 7 it is advantageous to bridge each main coil 30 with a respective condenser 50 to short circuit the high frequency alternating current flow from the source 60 which is utilized for control purposes as previously described, so that this alternating current is applied only to the auxiliary coil 40 which is localized in the region of the pole shoe and thereby minimizes stray flux.

In the parallel circuit of FIG. 8, a corresponding condenser 50 can be provided in series with the auxiliary coil 40 across the main coil 30 to act as a DC blocking condenser limiting the direct current flow through the coil proximal to the pole shoe and enabling this coil to be dimensioned only as is necessary for AC energization.

Since the omission of the longitudinal bars 5 might be expected to weaken the stator, I compensate for this by forming the pole shank plates 21 and 22 so that they are overlapped by the yoke plates 11 and 12, this being achieved as can be seen from FIG. 3, by providing the plates 11 and 12 with projections 11a and 12a which form and force-lockingly engage the cheek plates 21 and 22.

Figure 5:
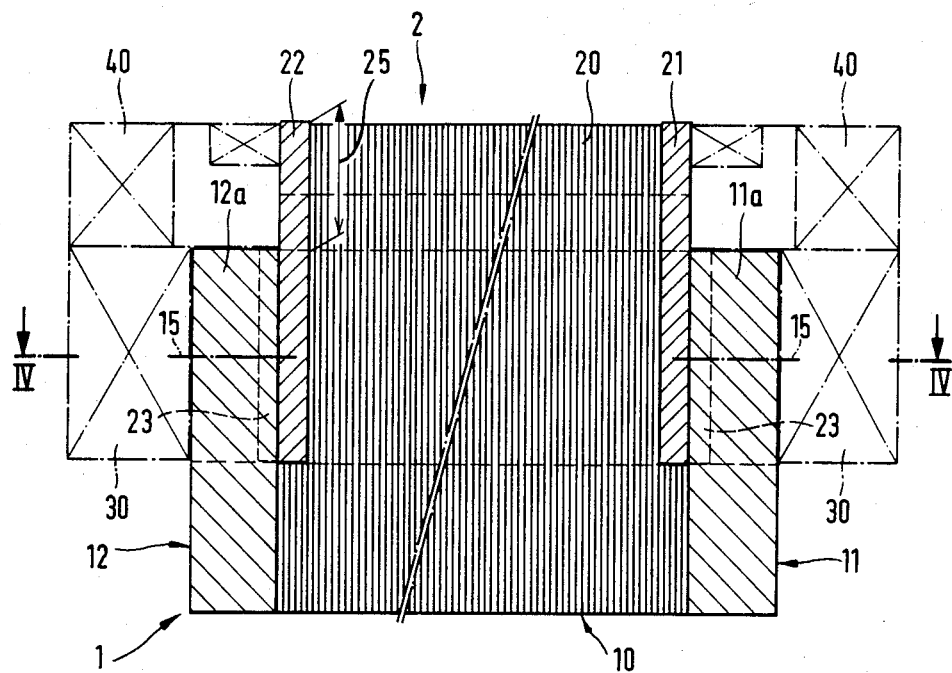
FIG. 5 is a vertical section taken along the line V—V of FIGS. 3 and 4.

These projections can correspond in width to the plates 21 and 22 but need extend only over part of the height thereof and can be surrounded by the coils 30 (FIG. 5). The preferred height brings these projections flush with the upper face of the coils 30 and the lower face of the coils 40.

Figure 4:
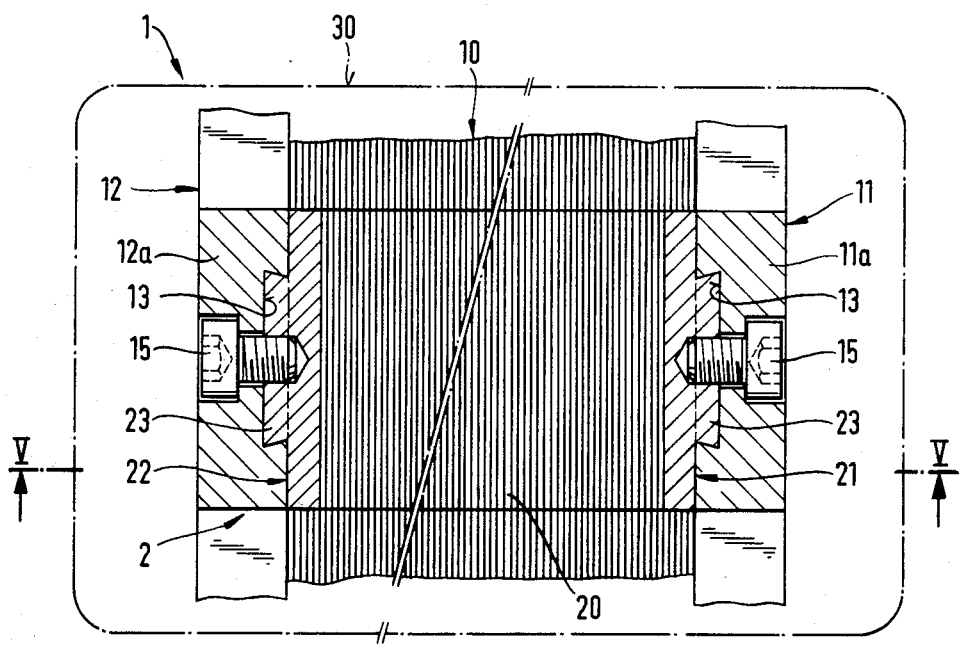
FIG. 4 is a horizontal section taken along the line IV—IV of FIG. 3.

The interfitting connection can be provided by a groove 13 in each projection which receives a complementary male formation 23 of the plate 21 or 22, these formations constituting a dovetail connection as is clear from FIG. 4.

In addition, the projections 11a and 12a are secured to the plates 21 and 22 by screws or bolts 15 which can be countersunk in the projections 11a and 12a (FIG. 4) and the thicknesses of the yoke plates 11 and 12 together with their projections can be substantially greater than the thickness of the cheek plates 21 and 22. For example, the yoke plates 11 and 12 can have a thickness of say 20 mm while the cheek plates 21 and 22 have a thickness of say 5 mm.

Because the openings 14 between the pole shoes contain the additional coils 40, the stray flux losses arising from the exposed surfaces of the pole shanks are significantly reduced thereby improving the dynamics of the magnets. A further improvement is obtained if the coils 40 are dimensioned to provide a higher current density than the respective coils 30. This can be accomplished by utilizing aluminum wire for the turns of the main coils 30 and copper wire for the auxiliary coils 40. The higher current density shifts the current distribution along the pole shanks toward the pole face, thereby further reducing the stray inductivity.

I claim:

1. A linear stator magnet adapted to be juxtaposed with an armature rail, comprising:
    a sheet stack yoke formed with a plurality of longitudinally spaced codirectionally extending sheet stack pole shanks;
    respective cheek plates flanking each of said pole shanks, said pole shanks each being formed with a pole shoe remote from continuous portions of said yoke, said pole shoes having pole faces adapted to be juxtaposed with said rail;
    respective yoke plates flanking said continuous portion of said yoke and overlapping said cheek plates and form and force-locked thereto;
    respective main excitation coils surrounding said shanks; and
    respective auxiliary excitation coils surrounding each of said pole shoes and locked in the gaps between said pole shoes while being connected in circuit with the main excitation coil to a source of excitation current.

2. The linear stator magnet defined in claim 1 wherein said yoke plates are each formed with a plurality of projections overlapping the respective cheek plates and longitudinally spaced apart on said yoke plates, said projections and the respective cheek plates being formed with interfitting male and female formations.

3. The linear stator magnet defined in claim 2 wherein each of said projections is provided with a dovetail groove and each of said cheek plates has a dovetail tongue received in the respective groove.

4. The linear stator magnet defined in claim 2 wherein said auxiliary excitation coils are dimensioned for greater current density than the respective main excitation coil.

5. The linear stator magnet defined in claim 2 wherein each of said auxiliary excitation coils is connected in series with the respective main excitation coil.

6. The linear stator magnet defined in claim 5 wherein a respective condenser is bridged across each main excitation coil.

7. The linear stator magnet defined in claim 1 wherein each auxiliary excitation coil is connected in parallel with the respective main excitation coil.

8. The linear stator magnet defined in claim 7 wherein each auxiliary excitation coil is connected in parallel with a respective condenser across a respective main excitation coil.

9. The linear stator magnet defined in claim 1 wherein said projections extend within said main excitation coils to a level substantially flush with the surface of the main excitation coil proximal to the respective pole shoe.

10. The linear stator magnet defined in claim 9, further comprising respective poles countersunk in said projections and threaded into the respective cheek plates.

* * * * *